United States Patent
Ogawa et al.

(10) Patent No.: US 7,251,124 B2
(45) Date of Patent: Jul. 31, 2007

(54) CABINET CORD EJECT STRUCTURE

(75) Inventors: Masuo Ogawa, Osaka (JP); Shinichiro Sakamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 602 days.

(21) Appl. No.: 10/701,852

(22) Filed: Nov. 5, 2003

(65) Prior Publication Data
US 2004/0105037 A1    Jun. 3, 2004

(30) Foreign Application Priority Data
Nov. 28, 2002   (JP)   .................. 2002-007568 U (51) Int. Cl.
G06F 1/16        (2006.01)
(52) U.S. Cl. .................. 361/681; 361/682; 348/373
(58) Field of Classification Search ........... 361/679, 361/681, 682; 348/373
See application file for complete search history.

(56) References Cited
FOREIGN PATENT DOCUMENTS

| JP | 47-4043 | 2/1972 |
|---|---|---|
| JP | 51-41667 | 3/1976 |
| JP | 53-10825 | 3/1978 |
| JP | 61-39980 | 3/1986 |
| JP | 5-18068 | 3/1993 |

OTHER PUBLICATIONS

Examiner's Technical Opinion issued in Japanese Utility Model Application No. 2002-007568 mailed on Feb. 14, 2003 and English Translation thereof, 9 pages.

*Primary Examiner*—Yean-Hsi Chang
(74) *Attorney, Agent, or Firm*—Osha Liang LLP (57) ABSTRACT

A cabinet cord eject structure includes a cord eject port penetrated in a rear part of a rear cabinet molded of a flame retardant synthetic resin, and a movable lid for closing the cord eject port integrally formed via a thin hinge portion on the rear cabinet. The movable lid is rotated open around the thin hinge portion, a chassis is inserted into the rear cabinet, an AC cord is pulled out through the cord eject port, the chassis is placed on a bottom plate portion of the rear cabinet, and the movable lid is rotated closed around the thin hinge portion to close the cord eject port.

7 Claims, 11 Drawing Sheets

CABINET CORD EJECT STRUCTURE

BACKGROUND OF THE INVENTION

1. Field of the Invention

The present invention relates to a cabinet cord eject structure for a magnetic tape device integrated television receiver or a stand-alone television receiver.

2. Description of the Related Art

Figure 11:
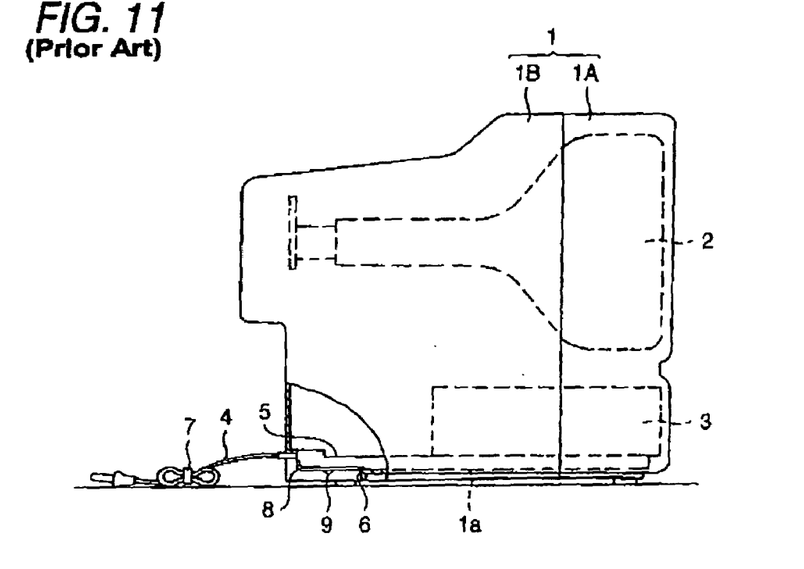
FIG. 11 is a side view, partially cut away, showing a conventional example.
Figure 12:
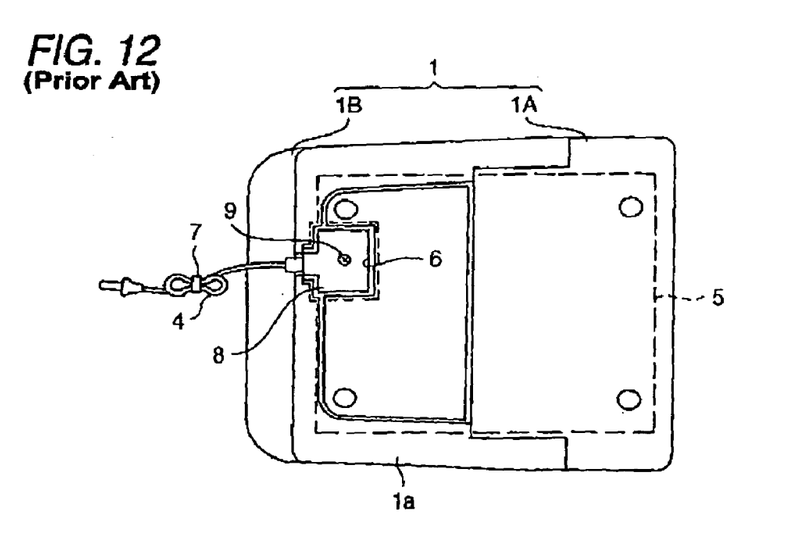
FIG. 12 is a bottom view of the conventional example.

FIGS. 11 and 12 show an example of a magnetic tape device integrated television receiver (so-called "televideo"). In this example, a cathode ray tube 2 is disposed at the upper part of a cabinet 1 composed of a front cabinet 1A and a rear cabinet 1B, and a magnetic tape device 3 and a chassis 5 with an AC cord 4 are disposed at the lower part of the cabinet 1. The cabinet 1 is molded of flame retardant synthetic resin to with stand high voltages, and the chassis 5 is molded of in expensive flammable synthetic resin, with a cord eject port 6 penetrated in a rear part of the rear cabinet 1B.

Figure 13A:
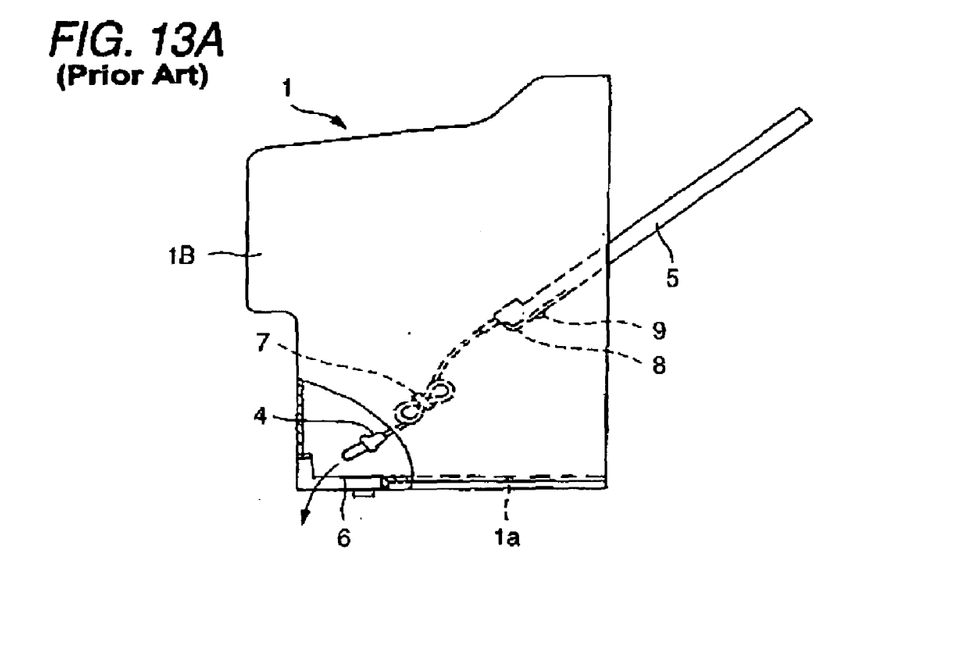
FIGS. 13A and 13B are side views, partially cut away, showing an assembling procedure.
Figure 13B:
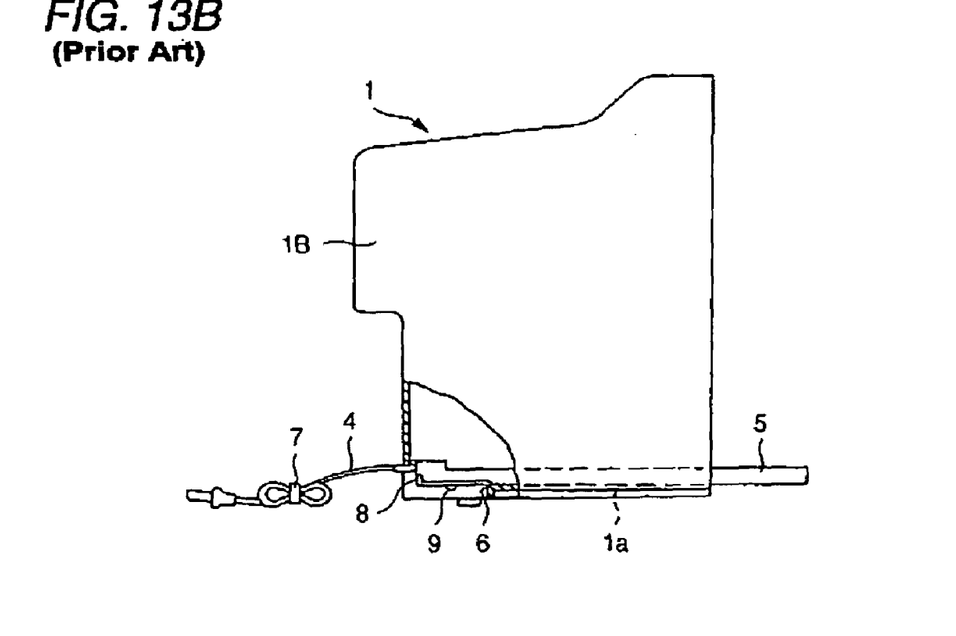

An assembling procedure involves inserting the chassis 5 into the rear cabinet 1B in a state where the AC cord 4 is bound by a binder 7 to easily handle the AC cord 4 as shown in FIG. 13A, and pulling out the AC cord 4 through the cord eject port 6 and disposing the chassis 5 on a bottom plate portion 1a of the rear cabinet 1B as shown in FIG. 13B.

The above constitution has some problem in respect of accident prevention, because the chassis 5 made of flammable synthetic resin is exposed to the outside through the cord eject port 6. Thereby, it is required to close the cord eject port 6 with flame retardant material in accordance with the UL standards.

Conventionally, to solve the above-mentioned problem, a metallic plate 8 made of a flame retardant material that is opposed to the cord eject port 6 is fixed by a screw 9 to the chassis 5 to close the cord eject port 6, as described in JP-A-5-18068.

In the above constitution, the metallic plate 8 is fixed by the screw 9 to the chassis 5 to close the cord eject port 6. However, this fixing operation is troublesome and requires a lot of time, and because of the use of the metallic plate 8, the number of parts is increased. These increase the manufacturing costs.

SUMMARY OF THE INVENTION

The present invention has been made to solve the above-mentioned problems, and it is an object of the invention to provide a cabinet cord eject structure in which a cord eject port is securely closed with a smaller number of parts.

In order to accomplish the above object, a first aspect of the present invention provides a cabinet cord eject structure for a magnetic tape device integrated television receiver or a stand-alone television receiver, including: a front cabinet molded of a flame retardant synthetic resin; a rear cabinet molded of a flame retardant synthetic resin and having a bottom plate portion, the rear cabinet having a cord eject port in a rear part thereof; a chassis having a cord and disposed in the front and rear cabinets; and a movable lid for closing the cord eject port, the movable lid including a lid main body formed integrally on the bottom plate portion of the rear cabinet to be openable and closable via a thin hinge portion, an auxiliary plate projecting substantially at right angles from the top end portion of the lid main body and having a chassis opposed face, and a tab portion jutted out from a top of the movable lid; wherein the auxiliary plate is partially cut away to form a cord inserting part for passing the cord; a convex portion is protruded on the chassis opposed face of the auxiliary plate, with a central through hole bored in the convex portion; a concave portion is formed on a rear face of the chassis opposed to the convex portion, with a tapped hole formed through the center of the concave portion in the chassis; a length of the convex portion along a projecting direction of the auxiliary plate is set to be almost equal to a length of the concave portion, and a breadth of the convex portion along a direction orthogonal to the projecting direction is set to be slightly smaller than a breadth of the concave portion; and the movable lid is fixed to the chassis by screwing a screw through the central through hole of the convex portion into the tapped hole of the chassis in a state where the cord of the chassis is pulled out through the cord eject port and the movable lid is rotated to close the cord eject port and the convex portion is fitted into the concave portion.

The above constitution corresponds to one embodiment of the invention (see FIGS. 1 to 9). With this constitution, the movable lid for enclosing the cord eject port is formed integrally on the rear cabinet via the thin hinge portion, whereby the number of parts is not increased, and the manufacturing cost is cheaper than the case where the conventional metallic plate is employed to enclose the cord eject port. Since the movable lid is formed in the shape of L-character of the lid main body and the auxiliary plate, the movable lid having the shape of L-character closes the corner portion from the lower face of the chassis to the rear face, except for the cord inserting port formed in the auxiliary plate, whereby it is possible to provide the magnetic tape device integrated television receiver or the stand-alone television receiver superior in respect of the accident prevention in accordance with the UL standards.

When the movable lid is rotated open around the thin hinge portion by using the tab portion jutted out from the movable lid, the cord eject port is opened, so that the cord is easily pulled out through the cord eject port. Also, when the movable lid is rotated closed around the thin hinge portion, the cord eject port is simply closed with the movable lid. The cord eject port is securely kept closed by fitting the convex portion of the movable lid into the concave portion of the chassis.

As described above, the movable lid is rotated open or closed around the thin hinge portion, whereby the positional relation between the central through hole of the convex portion and the tapped hole of the chassis is likely to be deviated along the opening or closing direction. However, since the length of the convex portion and the length of the concave portion along the projecting direction of the auxiliary plate (opening or closing direction) are set to be almost equal, the central through hole of the convex portion is matched almost concentrically with the tapped hole of the chassis only by fitting the convex portion into the concave portion. Thereby, it is possible to screw the screw through the central through hole of the convex portion into the tapped hole of the chassis efficiently and easily.

Herein, "set to be almost equal" means that the length of the convex portion and the length of the concave portion are set in a manner that the movable lid is not rotated open unexpectedly after the convex portion fits into the concave portion. For example, the length of the convex portion and the length of the concave portion may be set to be identical. Also, the length of the convex portion may be slightly short than that of the concave portion.

Further, since the breadth of the convex portion is set to be smaller than the breadth of the concave portion, and there is some gap between the convex portion and the concave portion along the breadth direction, the convex portion may be slightly deformed in the breadth direction to be easily fitted into the concave portion, even if the length of the convex portion is slightly larger than the length of the concave portion due to a dimensional error.

As described above, since the movable lid is securely fixed to the chassis by screwing a screw through the central through hole of the convex portion into the tapped hole of the chassis, the movable lid is not rotated open unexpectedly and with high safety, even though an excessive force is falsely applied on the movable lid by the user.

Incidentally, the front and rear cabinet may be molded of a flame retardant synthetic resin such as polystyrene.

A second aspect of the invention provides a cabinet cord eject structure including: a cord eject port penetrated in a rear part of a cabinet molded of a flame retardant synthetic resin; a chassis having a cord that is pulled out through the cord eject port; and a movable lid for closing the cord eject port, the movable lid being integrally formed via a thin hinge portion on the cabinet; wherein the movable lid is rotated open around the thin hinge portion; the chassis is inserted into the cabinet to be placed on a bottom plate portion of the cabinet and the cord is pulled out through the cord eject port; and the movable lid is rotated closed around the thin hinge portion to close the cord eject port.

With the above constitution, the movable lid for closing the cord eject port is integrally formed via the thin hinge portion on the cabinet, whereby the number of parts is not increased, and the manufacturing cost is cheaper than the case where the conventional metallic plate is employed to close the cord eject port. When the movable lid is rotated open around the thin hinge portion, the cord eject port is opened, so that the cord is easily pulled out through the cord eject port. Also, when the movable lid is rotated closed around the thin hinge portion, the cord eject port is simply closed in accordance with the UL standards.

A third aspect of the invention provides the cabinet cord eject structure wherein the movable lid includes a lid main body formed integrally on the bottom plate portion of the cabinet to be openable or closable via the thin hinge portion, and an auxiliary plate projecting substantially at right angles from a top end portion of the lid main body, the auxiliary plate being partially cut away to form a cord inserting part for passing the cord.

With the above constitution, since the movable lid is formed in the shape of L-character of the lid main body and the auxiliary plate, the movable lid having the shape of L-character securely closes the corner portion from the lower face of the chassis to the rear face, except for the cord inserting portion formed in the auxiliary plate.

A fourth aspect of the invention provides the cabinet cord eject structure wherein a tab portion is jutted out from a top of the movable lid.

With the above constitution, the movable lid is easily rotated open or closed by grasping the tab portion.

A fifth aspect of the invention provides the cabinet cord eject structure wherein a convex portion is protruded on a chassis opposed face of the auxiliary plate, and a concave portion is formed on a rear face of the chassis opposed to the convex portion, and the movable lid is rotated closed to fit the convex portion into the concave portion.

With the above constitution, the cord eject port is securely kept enclosed with the movable lid by fitting the convex portion of the movable lid into the concave portion of the chassis.

A sixth aspect of the invention provides the cabinet cord eject structure wherein a central through hole is bored in the convex portion, and a tapped hole is formed through the center of the concave portion in the chassis, and a screw is screwed through the central through hole of the convex portion fitted into the concave portion into the tapped hole of the chassis.

With the above constitution, since the movable lid is securely fixed to the chassis by screwing the screw through the central through hole of the convex portion into the tapped hole of the chassis, the movable lid is not rotated open unexpectedly and with high safety, even though an excessive force is falsely applied on the movable lid 11 by the user A seventh aspect of the invention provides the cabinet cord eject structure, wherein the length of the convex portion along a projecting direction of the auxiliary plate is set to be almost equal to the length of the concave portion, and the breadth of the convex portion along the direction orthogonal to the projecting direction is set to be slightly smaller than the breadth of the concave portion.

With the above constitution, the movable lid is rotated open or closed around the thin hinge portion, whereby the positional relation between the central through hole of the convex portion and the tapped hole of the chassis is likely to be deviated along the opening or closing direction. However, since the length of the convex portion and the length of the concave portion along the projecting direction are set to be almost equal, the central through hole of the convex portion is matched almost concentrically with the tapped hole of the chassis only by fitting the convex portion into the concave portion. Thereby, it is possible to screw the screw through the central through hole of the convex portion into the tapped hole of the chassis efficiently and easily.

Also, since the breadth of the convex portion is set to be smaller than the breadth of the concave portion, and there is some gap between the convex portion and the concave portion along the breadth direction, the convex portion may be slightly deformed in the breadth direction to be easily fitted into the concave portion, even if the length of the convex portion is slightly larger than the length of the concave portion due to a dimensional error.

DETAILED DESCRIPTION OF THE PREFERRED EMBODIMENTS

Figure 1:
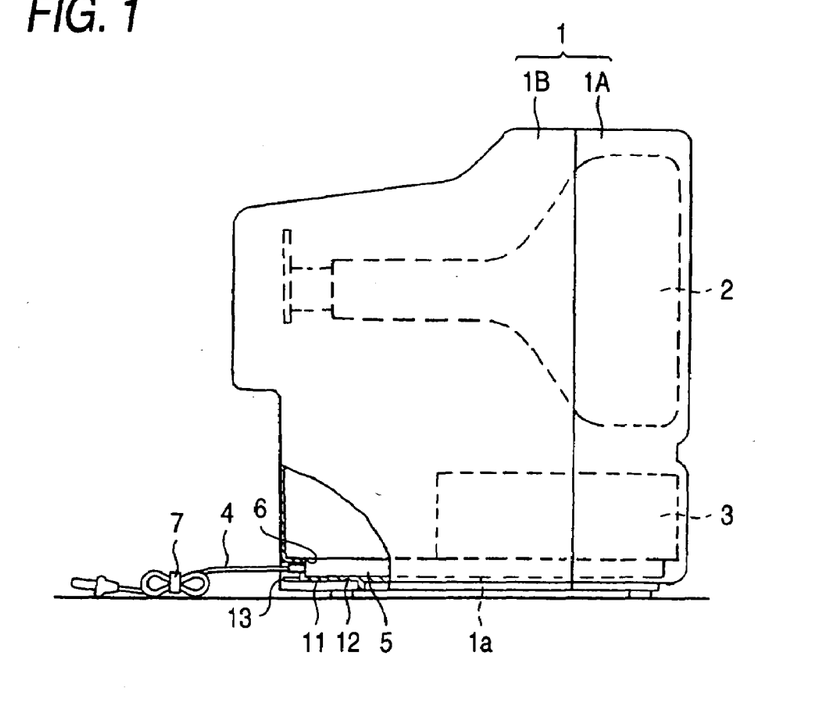
FIG. 1 is a side view, partially cut away, showing a cabinet cord eject structure according to one embodiment of the present invention.
Figure 2:
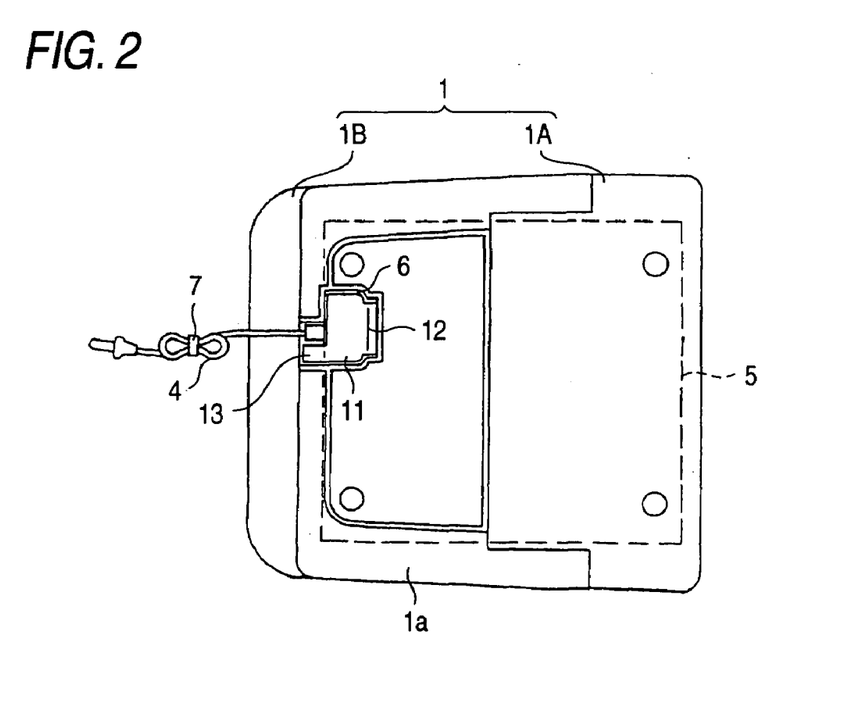
FIG. 2 is a bottom view of the cord eject structure.

FIGS. 1 and 2 show a cabinet cord eject structure 1 in a magnetic tape device integrated television receiver (so-called televideo). A movable lid 11 for closing a cord eject port 6 is formed integrally with a rear cabinet 1B via a thin hinge portion 12. Except for the above constitution, the cord eject structure is almost the same as shown in FIGS. 11 and 12, so the same or similar parts are designated by the same numerals as in FIGS. 11 and 12, and not described here.

Figure 3A:
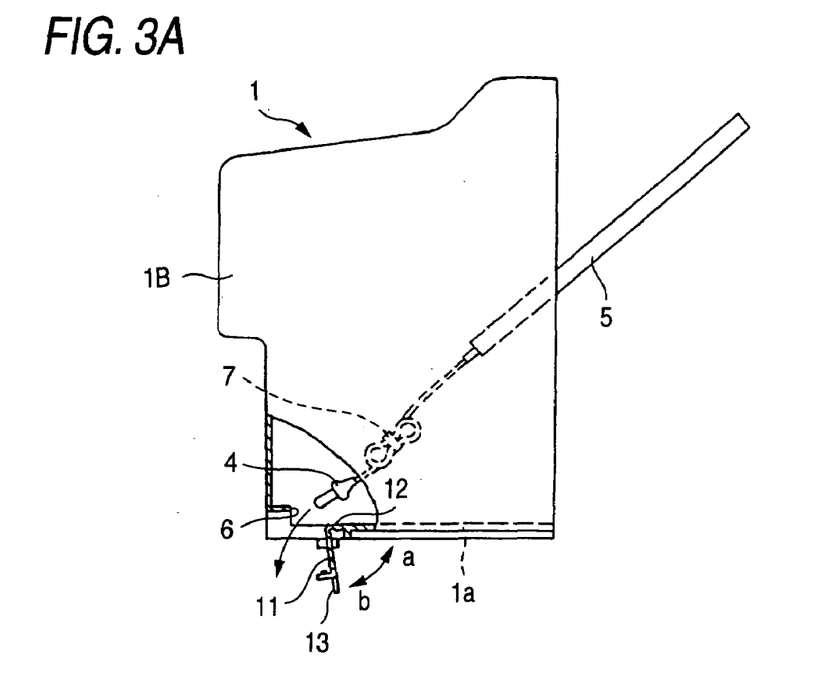
FIGS. 3A and 3B are side views, partially cut away, showing an assembling procedure.
Figure 3B:
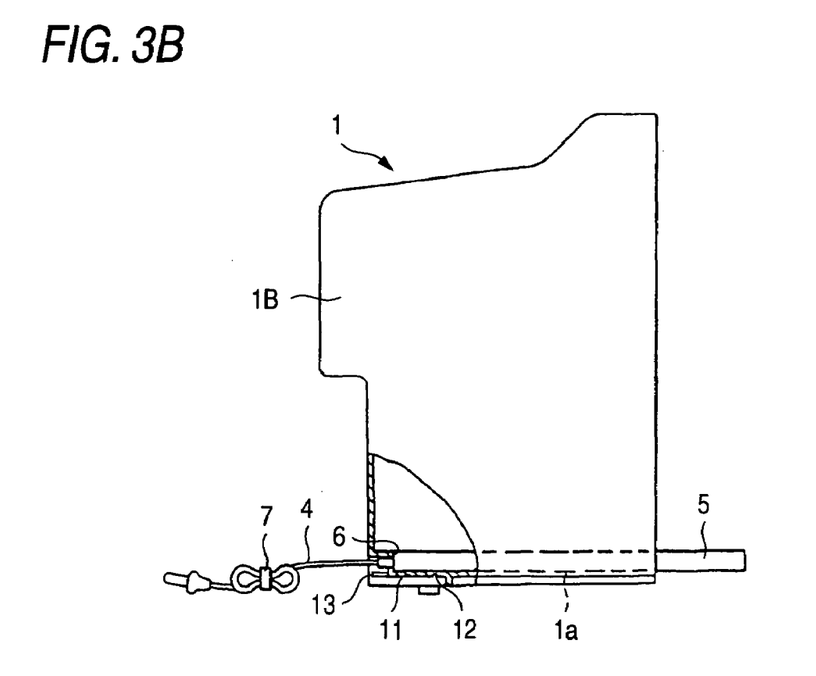
Figure 4:
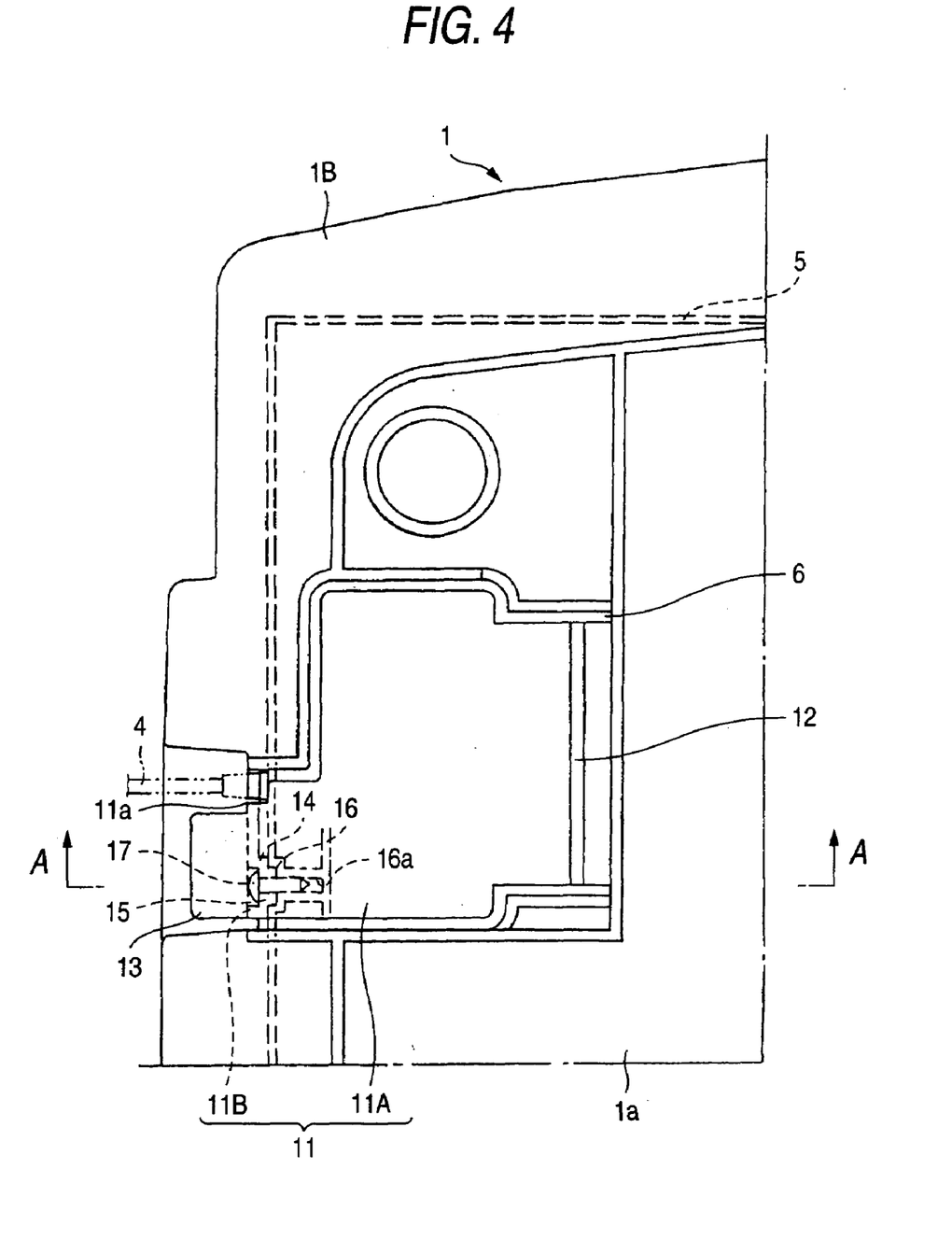
FIG. 4 is an enlarged bottom view of the same structure.

In an assembling procedure, the movable lid 11 is rotated open (direction "a") around the thin hinge portion 12 to insert a chassis 5 into the rear cabinet 1B as shown in FIG. 3A. Then, an AC cord 4 is pulled out through the cord eject port 6, as shown in FIG. 3B. Then, the chassis 5 is disposed on a bottom plate portion 1a of the rear cabinet 1B, and the movable lid 11 is rotated closed (direction "b") around the thin hinge portion 12 to close the cord eject port 6.

With the above constitution, since the movable lid 11 is formed integrally with the rear cabinet 1B via the thin hinge portion 12, the number of parts is not increased and the manufacturing cost is cheaper than the case where the conventional metallic plate 8 is employed to close the cord eject port 6 (see FIG. 11). If the movable lid 11 is rotated open (direction "a") around the thin hinge portion 12, the cord eject port 6 is opened, so that the AC cord 4 is easily pulled out through the cord eject port 6. Also, if the movable lid 11 is rotated closed (direction "b") around the thin hinge portion 12, the cord eject port 6 is simply closed.

The movable lid 11 includes a lid main body 11A formed integrally with the bottom plate portion 1a to be openable or closable via the thin hinge portion 12, and an auxiliary plate 11B rising at rights from the top end portion of the lid main body 11A, as shown in FIGS. 4 to 7. The auxiliary plate 11B is partially cut away to form a cord inserting portion 11a for passing the AC cord 4.

With the above constitution, since the movable lid 11 is formed in the shape of L-character by the lid main body 11A and the auxiliary plate 11B, the movable lid 11 having the shape of L-character fully closes a corner portion from a lower face 5a of the chassis 5 to a rear face 5b, except for the cord inserting portion 11a formed in the auxiliary plate 11B, whereby it is possible to provide a "televideo" that is superior in respect of the accident prevention in accordance with the UL standards.

Figure 5:
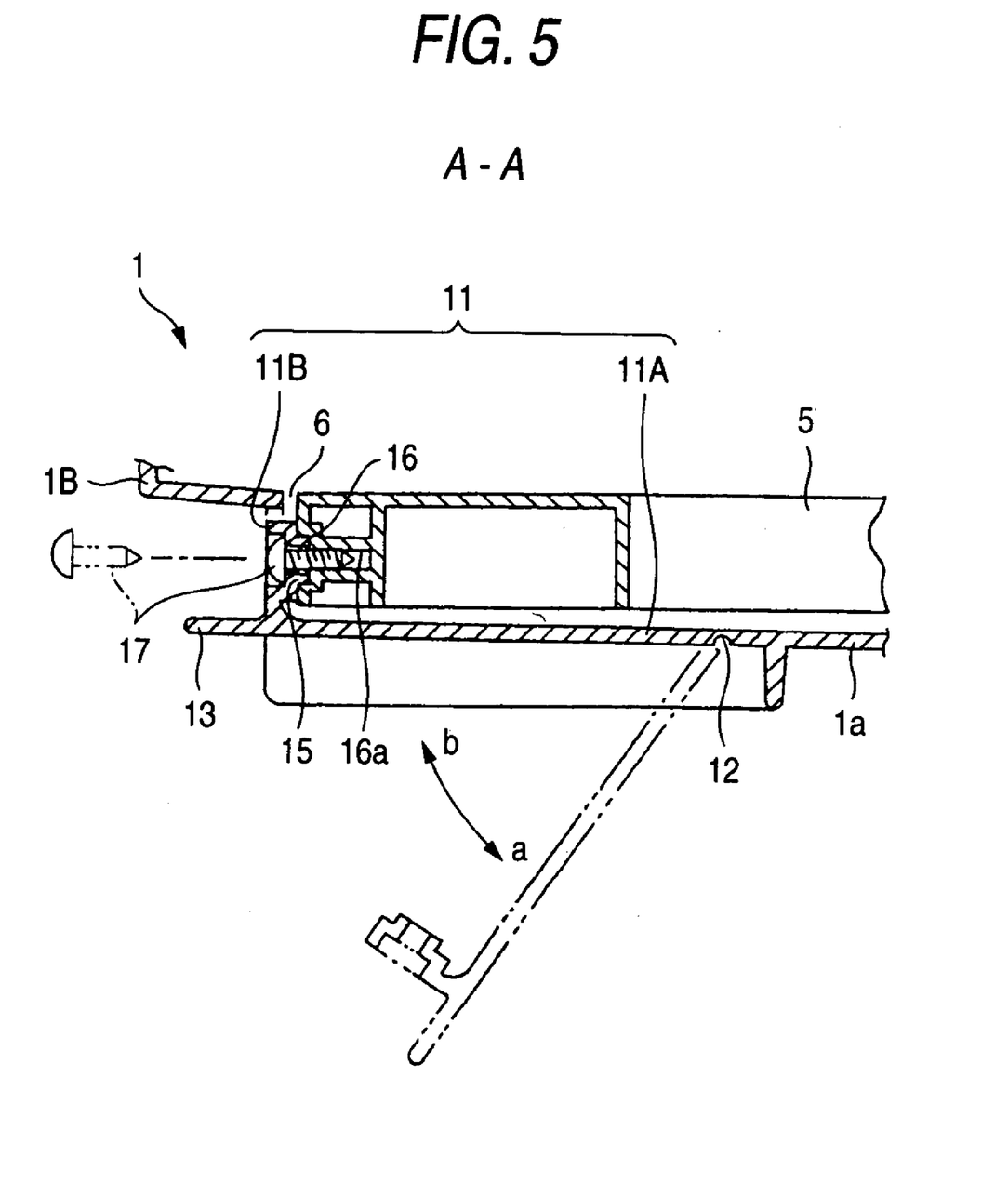
FIG. 5 is a cross-sectional view taken along line A—A in FIG. 4.
Figure 6:
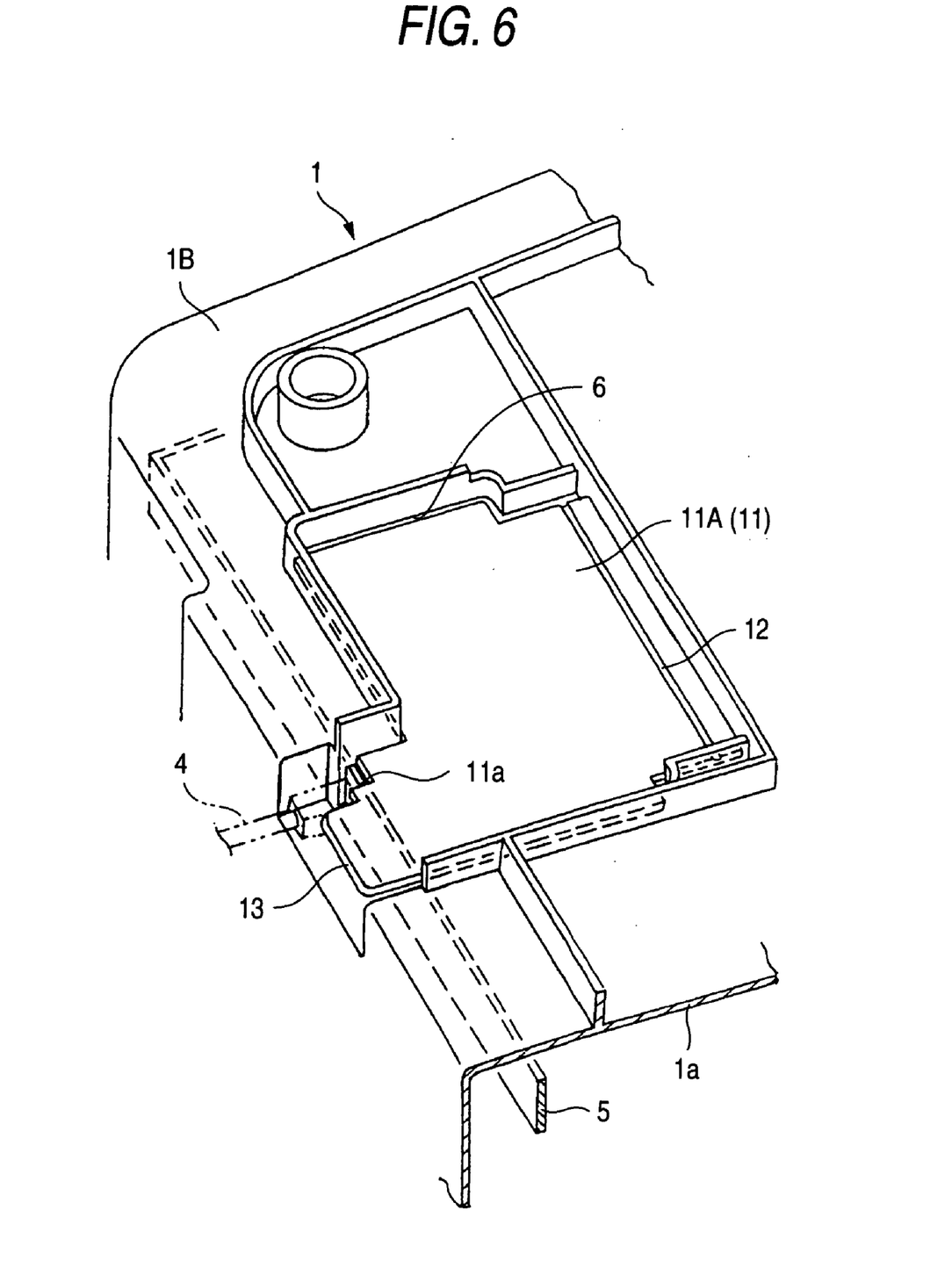
FIG. 6 is an enlarged perspective view of the same structure in a state where a movable lid is closed.
Figure 7:
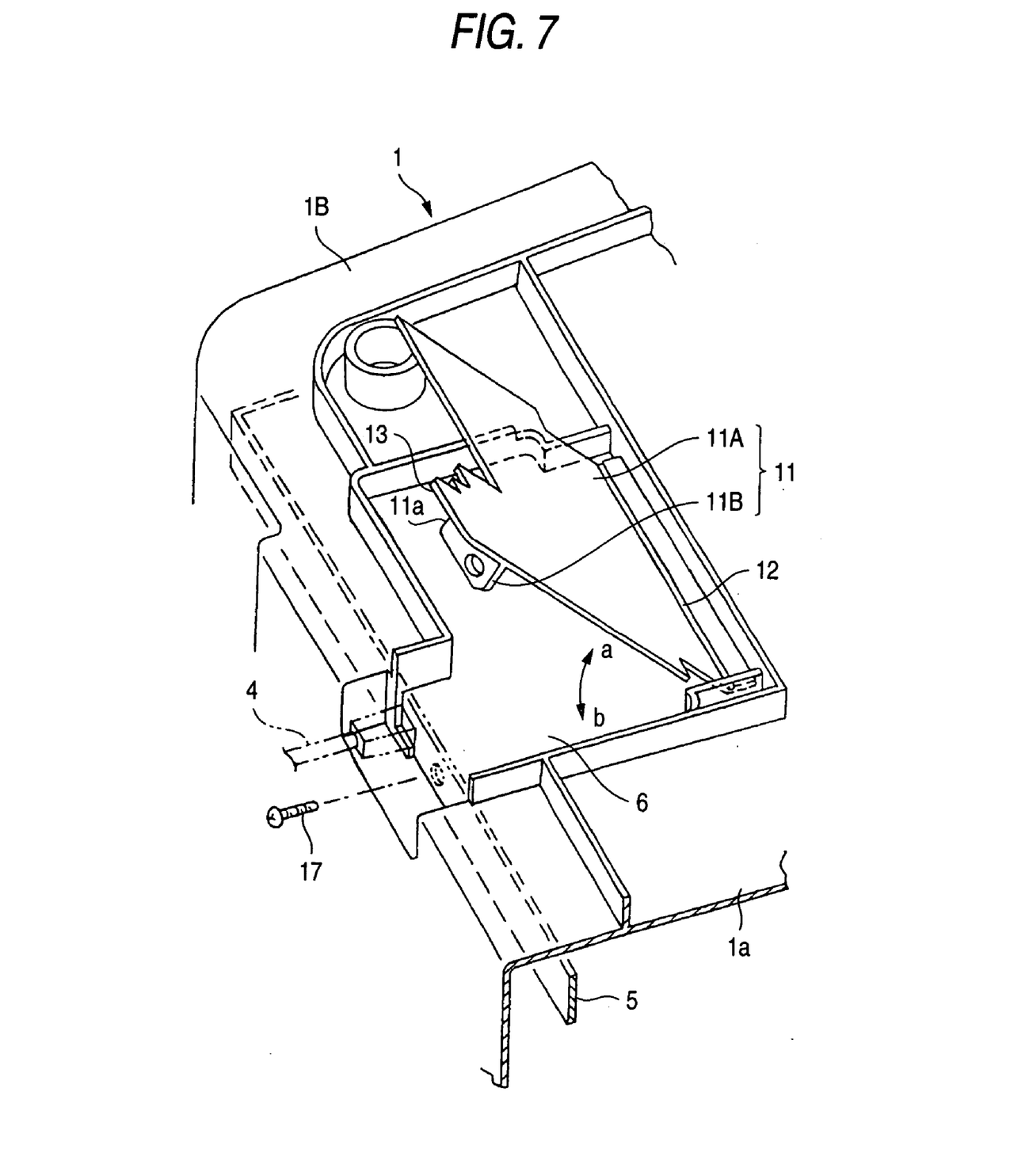
FIG. 7 is an enlarged perspective view of the same structure in a state where the movable lid is open.

A tab portion 13 is jutted out from a top end portion of the movable lid 11, as shown in FIG. 5. The movable lid 11 is easily rotated open or closed by using the tab portion 13.

Figure 8:
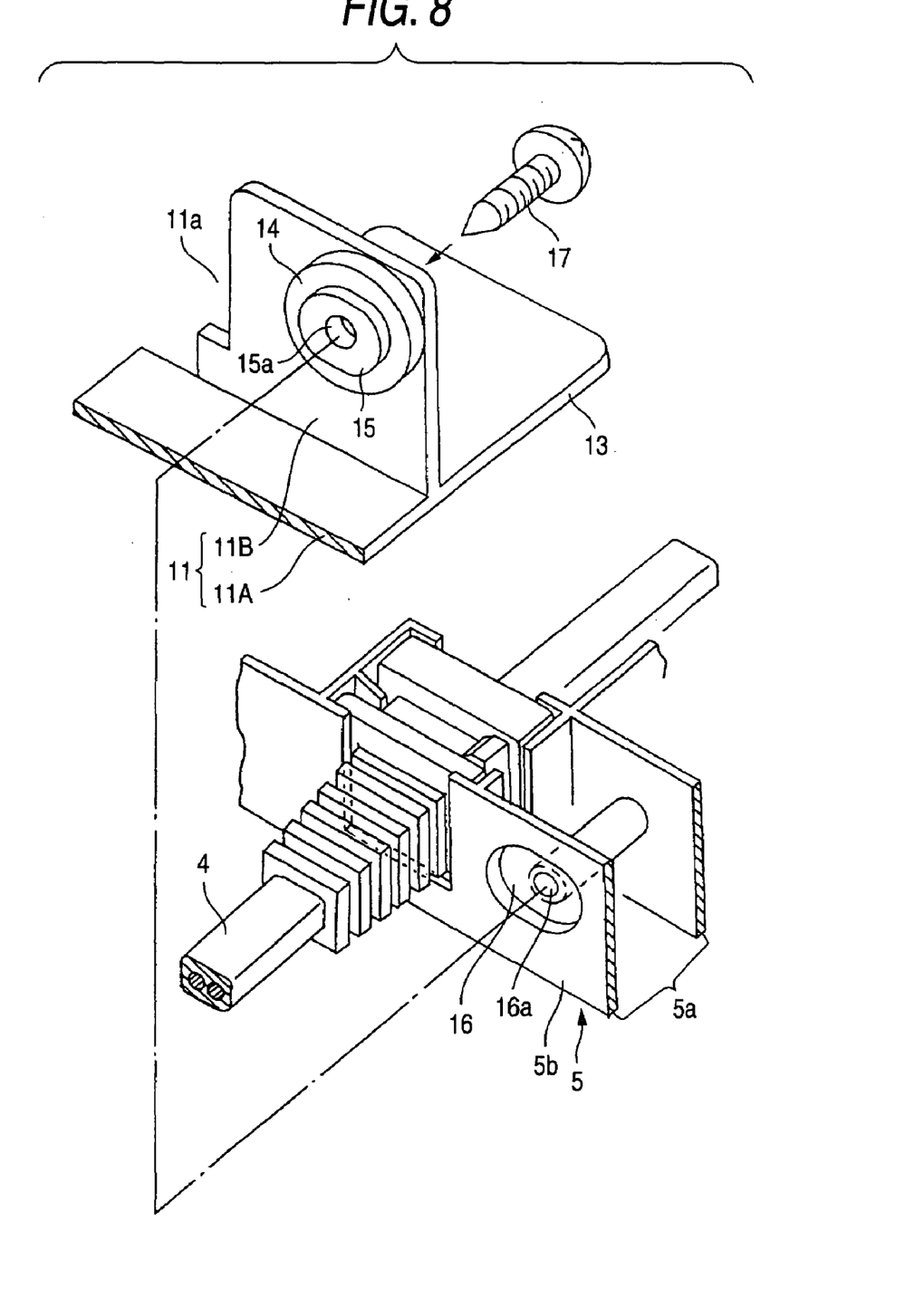
FIG. 8 is an exploded perspective view of the same structure.

Along circular convex portion 15 is protruded from a circular protrusion 14 formed integrally with a chassis opposed face of the auxiliary plate 11B, and a long circular concave portion 16 is formed on the rear face 5b of chassis 5 opposed to the convex portion 15, as shown in FIG. 8. The cord eject port 6 is securely kept closed with the movable lid 11 by rotating the movable lid 11 closed (direction "b") to fit the convex portion 15 into the concave portion 16 (see FIG. 5).

Also, a central through hole 15a is bored in the convex portion 15, and a tapped hole 16a is formed through the center of the concave portion 16 in the chassis 5. Since the movable lid 11 is securely fixed to the chassis 5 by screwing a screw 17 through the central through hole 15a of the convex portion 15, which is fitted into the concave portion 16, into the tapped hole 16a of the chassis 5, the movable lid 11 is not rotated open unexpectedly and with high safety, even though an excessive force is falsely applied on the movable lid 11 by the user.

Figure 10A:
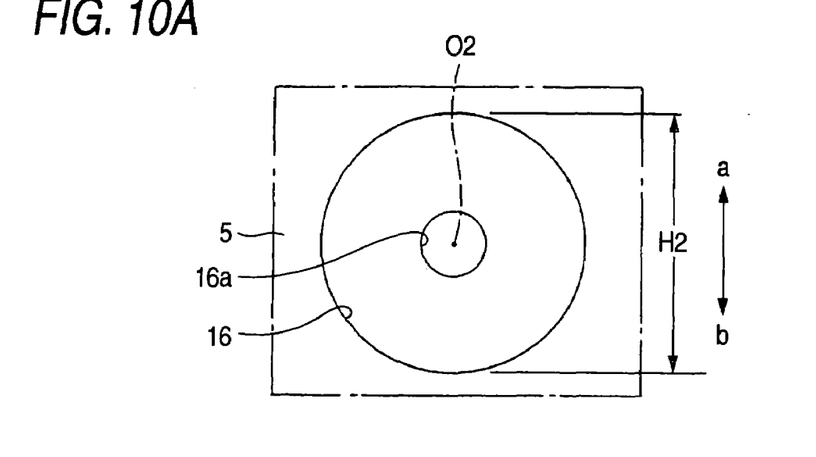
FIG. 10A is a front view of a concave portion in a comparative example.
Figure 10B:
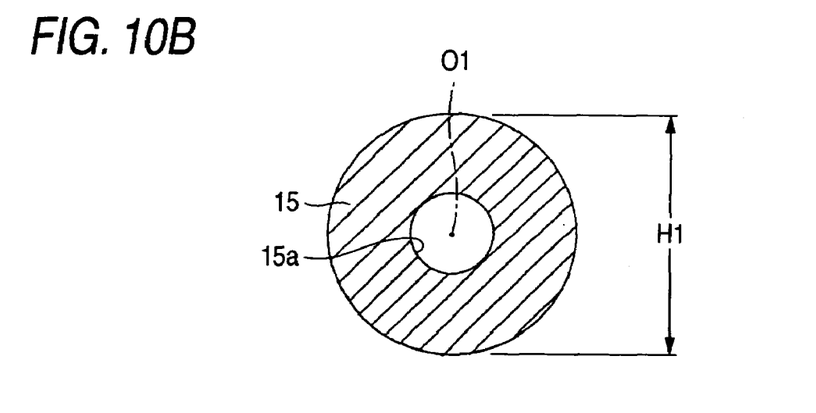
FIG. 10B is a cross-sectional view of a convex portion.
Figure 10C:
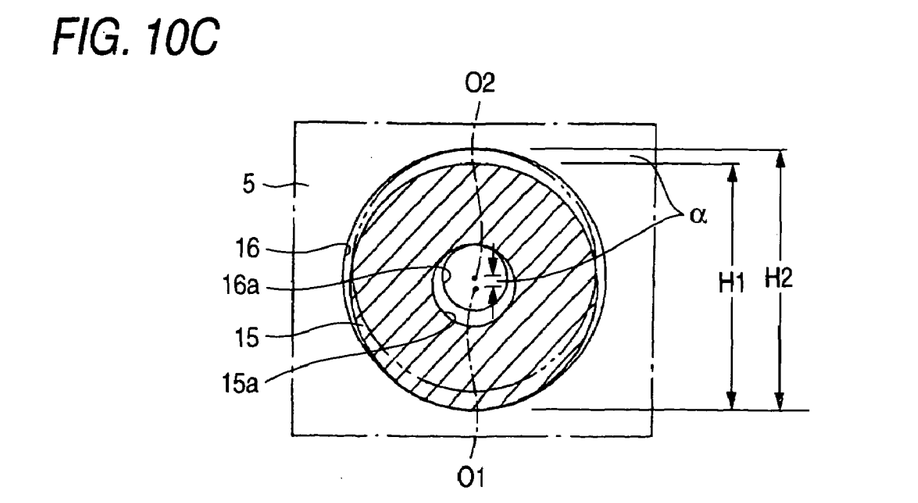
FIG. 10C is a cross-sectional view of the convex portion fitted into the concave portion.

Herein, it is common that the length H1 of the convex portion 15 along the opening or closing direction a, b is set to be smaller than the length H2 of the concave portion 16, like a comparative example as shown in FIGS. 10A and 10B. In this case, since the movable lid 11 is rotated open or closed along the opening or closing direction a, b around the thin hinge portion 12, an axial center 01 of the central through hole 15a in the convex portion 15 is likely to be deviated by a difference α between the lengths H1 and H2 from an axial center O2 of the tapped hole 16a in the chassis 5, when the convex portion 15 is fitted into the concave portion 16 as shown in FIG. 10C. Consequently, it is difficult to screw the screw 17 through the central through hole 15a into the tapped hole 16a due to the difference a, degrading the operation efficiency.

Figure 9A:
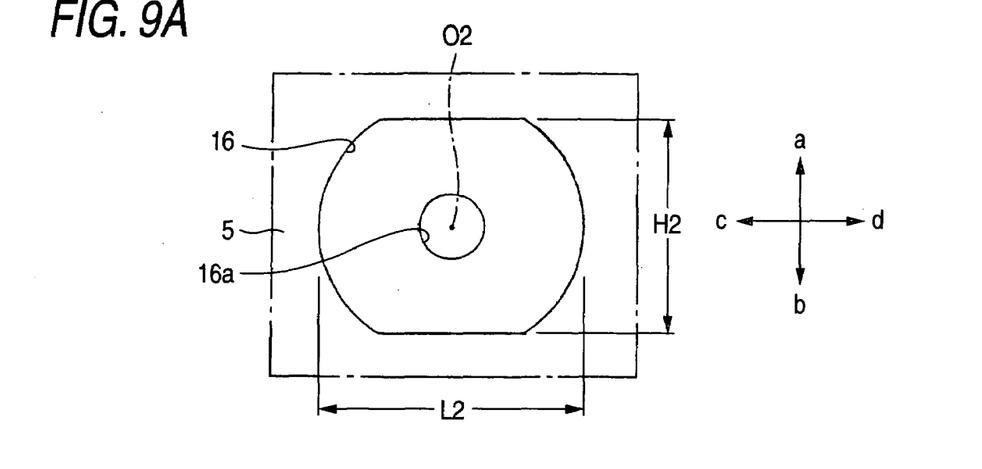
FIG. 9A is a front view of a concave portion.
Figure 9B:
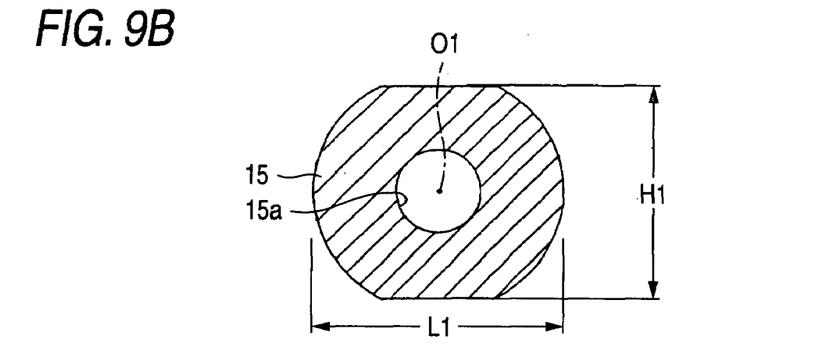
FIG. 9B is a cross-sectional view of a convex portion.
Figure 9C:
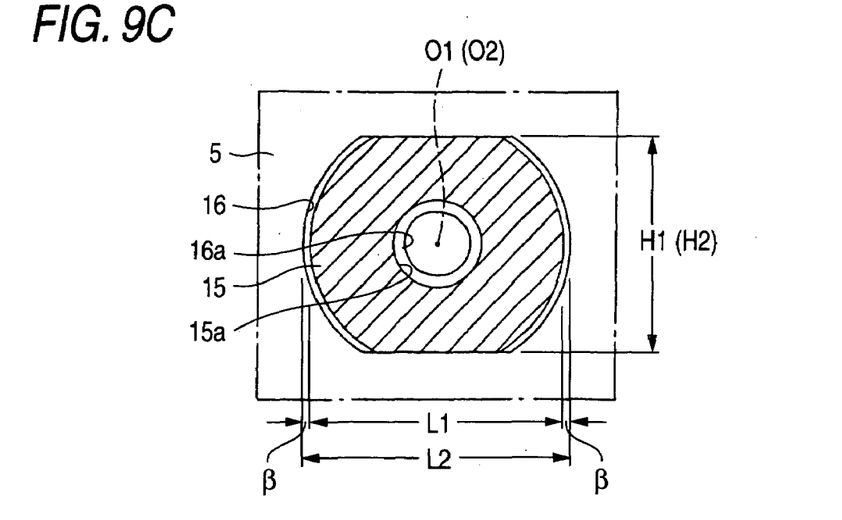
FIG. 9C is a cross-sectional view of the convex portion fitted into the concave portion.

On the contrary, according to the embodiment of the invention, the length H1 of the convex portion 15 along the opening or closing direction a, b is set to be almost equal to the length H2 of the concave portion 16, as shown in FIGS. 9A and 9B. Hence, when the convex portion 15 is fitted into the concave portion 16 as shown in FIG. 9C, the axial center 01 of the central through hole 15a in the convex portion 15 is matched almost concentrically with the axial center O2 of the tapped hole 16a in the chassis 5, so that the screw 17 is screwed through the central through hole 15a into the tapped hole 16a efficiently and easily.

Also, the breadth L1 of the convex portion 15 along the direction c, d orthogonal to the opening or closing direction a, b is set to be slightly smaller than the breadth L2 of the concave portion 16, and there is some gap β across the breadth L1, L2 between the convex portion 15 and the concave portion 16. For example, each gap β may be 0.2 mm. Therefore, even if the length H1 of the convex portion 15 is slightly larger than the length H2 of the concave portion 16 due to a dimensional error, the convex portion 15 may be slightly deformed in the direction of breadth L1 to be easily fitted into the concave portion 16.

The convex portion 15 and the concave portion 16 are formed in the shape of long circle, that is, each of the convex portion and the concave portion, in a plane view, have two straight sides opposed in parallel and two arc sides each of which connects ends of the straight sides. Therefore, convex portion is prevented from rotating with respect to the concave portion when screwing the screw 17.

Though in the above embodiment, the convex portion 15 and the concave portion 16 are formed in the shape of long circle, the invention is not limited to this embodiment, but they may be formed in the shape of ellipse or rectangle, for example.

Though the so-called televideo has been exemplified above, this invention is not limited to the televideo, but maybe applied to a stand-alone television receiver.

As was described above, according to the first aspect of the invention, the movable lid for closing the cord eject port is formed integrally on the rear cabinet via the thin hinge portion, whereby the number of parts is not increased, and the manufacturing cost is cheaper than the case where the conventional metallic plate is employed to close the cord eject port. Since the movable lid is formed in the shape of L-character of the lid main body and the auxiliary plate, the movable lid having the shape of L-character closes the corner portion from the lower face of the chassis to the rear face, except for the cord inserting port formed in the auxiliary plate, whereby it is possible to provide the magnetic tape device integrated television receiver or the stand-alone television receiver superior in respect of the accident prevention in accordance with the UL standards.

If the movable lid is rotated open around the thin hinge portion by grasping the tab portion jutted out from the movable lid, the cord eject port is opened, so that the cord is easily pulled out through the cord eject port. Also, if the movable lid is rotated closed around the thin hinge portion, the cord eject port is simply closed with the movable lid. The cord eject port is securely kept closed by fitting the convex portion of the movable lid into the concave portion of the chassis.

The movable lid is rotated open or closed around the thin hinge portion, whereby the positional relation between the central through hole of the convex portion and the tapped hole of the chassis is likely to be deviated along the opening or closing direction. However, since the length of the convex portion and the length of the concave portion along the opening or closing direction are set to be almost equal, the central through hole of the convex portion is matched almost concentrically with the tapped hole of the chassis only by fitting the convex portion into the concave portion. Thereby, it is possible to screw a screw through the central through hole of the convex portion into the tapped hole of the chassis efficiently and easily.

Since the breadth of the convex portion is set to be smaller than the breadth of the concave portion, and there is some gap between the convex portion and the concave portion along the breadth direction, the convex portion may be slightly deformed in the breadth direction to be easily fitted into the concave portion, even if the length of the convex portion is slightly larger than the length of the concave portion due to a dimensional error.

Since the movable lid is securely fixed to the chassis by screwing a screw through the central through hole of the convex portion into the tapped hole of the chassis, the movable lid is not rotated open unexpectedly and with high safety, even though an excessive force is falsely applied on the movable lid by the user.

According to the second aspect of the invention, the movable lid for closing the cord eject port is integrally formed via the thin hinge portion on the cabinet, whereby the number of parts is not increased, and the manufacturing cost is cheaper than the case where the conventional metallic plate is employed to close the cord eject port. If the movable lid is rotated open around the thin hinge portion, the cord eject port is opened, so that the cord is easily pulled out through the cord eject port. Also, if the movable lid is rotated closed around the thin hinge portion, the cord eject port is simply closed in accordance with the UL standards.

According to the third aspect of the invention, since the movable lid is formed in the shape of L-character of the lid main body and the auxiliary plate, the movable lid having the shape of L-character securely closes the corner portion from the lower face of the chassis to the rear face, except for the cord inserting portion formed in the auxiliary plate.

According to the fourth aspect of the invention, the movable lid is easily rotated open or closed by grasping the tab portion.

According to the fifth aspect of the invention, the cord eject port is securely kept closed with the movable lid by fitting the convex portion of the movable lid into the concave portion of the chassis.

According to the sixth aspect of the invention, since the movable lid is securely fixed to the chassis by screwing the screw through the central through hole of the convex portion into the tapped hole of the chassis, the movable lid is not rotated open unexpectedly and with high safety, even though an excessive force is falsely applied on the movable lid by the user.

According to the seventh aspect of the invention, the movable lid is rotated open or closed around the thin hinge portion, whereby the positional relation between the central through hole of the convex portion and the tapped hole of the chassis is likely to be deviated along the opening or closing direction. However, since the length of the convex portion and the length of the concave portion along the opening or closing direction are set to be almost equal, the central through hole of the convex portion is matched almost concentrically with the tapped hole of the chassis only by fitting the convex portion into the concave portion. Thereby, it is possible to screw the screw through the central through hole of the convex portion into the tapped hole of the chassis efficiently and easily.

Also, since the breadth of the convex portion is set to be smaller than the breadth of the concave portion, and there is some gap between the convex portion and the concave portion along the breadth direction, the convex portion may be slightly deformed in the breadth direction to be easily fitted into the concave portion, even if the length of the convex portion is slightly larger than the length of the concave portion due to a dimensional error.

What is claimed is:

1. A cabinet cord eject structure for a magnetic tape device integrated television receiver or a stand-alone television receiver, comprising:
    a front cabinet molded of a flame retardant synthetic resin;
    a rear cabinet molded of a flame retardant synthetic resin and having a bottom plate portion, the rear cabinet having a cord eject port in a rear part thereof
    a chassis having a cord and disposed in the front and rear cabinets; and
    a movable lid for closing the cord eject port, the movable lid including a lid main body formed integrally on the bottom plate portion of the rear cabinet to be openable and closable via a thin hinge portion, an auxiliary plate projecting substantially at right angles from the top end portion of the lid main body and having a chassis opposed face, and a tab portion jutted out from a top of the movable lid;
    wherein the auxiliary plate is partially cut away to form a cord inserting part for passing the cord;
    a convex portion is protruded on the chassis opposed face of the auxiliary plate, with a central through hole bored in the convex portion;
    a concave portion is formed on a rear face of the chassis opposed to the convex portion, with a tapped hole formed through the center of the concave portion in the chassis;
    a length of the convex portion along a projecting direction of the auxiliary plate is set to be almost equal to a length of the concave portion, and a breadth of the convex portion along a direction orthogonal to the projecting direction is set to be slightly smaller than a breadth of the concave portion; and the movable lid is fixed to the chassis by screwing a screw through the central through hole of the convex portion into the tapped hole of the chassis in a state where the cord of the chassis is pulled out through the cord eject port and the movable lid is rotated to close the cord eject port and the convex portion is fitted into the concave portion.

2. A cabinet cord eject structure comprising:

a cord eject port penetrated in a rear part of a cabinet molded of a flame retardant synthetic resin:

a chassis having a cord that is pulled out through the cord eject port; and a movable lid for closing the cord eject port, the movable lid being integrally formed via a thin hinge portion on the cabinet;

wherein the movable lid is rotated open around the thin hinge portion;

wherein the chassis is inserted into the cabinet to be placed on a bottom plate portion of the cabinet and the cord is pulled out through the cord eject port;

wherein the movable lid is rotated closed around the thin hinge portion to close the cord eject port; and wherein the movable lid comprises a lid main body formed integrally on a bottom plate portion of the cabinet to be openable or closable via a thin hinge portion, and an auxiliary plate projecting substantially at right angles from a top end portion of the lid main body, the auxiliary plate being partially cut away to form a cord inserting part for passing the cord at a side of the auxiliary plate.

3. The cabinet cord eject structure according to claim 2, wherein a tab portion is jutted out from a top of the movable lid.

4. A cabinet cord eject structure comprising:

a cord eject port penetrated in a rear part of a cabinet molded of a flame retardant synthetic resin;

a chassis having a cord that is pulled out through the cord eject port; and a movable lid for closing the cord eject port, the movable lid being integrally formed via a thin hinge portion on the cabinet;

wherein the movable lid is rotated open around the thin hinge portion;

wherein the chassis is inserted into the cabinet to be placed on a bottom plate portion of the cabinet and the cord is pulled out through the cord eject port;

wherein the movable lid is rotated closed around the thin hinge portion to close the cord eject port;

wherein the movable lid comprises a lid main body formed integrally on a bottom plate portion of the cabinet to be openable or closable via a thin hinge portion, and an auxiliary plate projecting substantially at right angles from a top end portion of the lid main body, the auxiliary plate being partially cut away to form a cord inserting part for passing the cord;

wherein a convex portion is protruded on a chassis opposed face of the auxiliary plate;

wherein a concave portion is formed on a rear face of the chassis opposed to the convex portion; and wherein the movable lid is rotated closed to fit the convex portion into the concave portion.

5. The cabinet cord eject structure according to claim 4, wherein a central through hole is bored in the convex portion, a tapped hole is formed through the center of the concave portion in the chassis, and a screw is screwed through the central through hole of the convex portion fitted into the concave portion into the tapped hole of the chassis.

6. The cabinet cord eject structure according to claim 5, characterized in that a length of the convex portion along a projecting direction of the auxiliary plate is set to be almost equal to a length of the concave portion, and a breadth of the convex portion along a direction orthogonal to the projecting direction is set to be slightly smaller than a breadth of the concave portion.

7. The cabinet cord eject structure according to claim 4, wherein each of the convex portion and the concave portion, in a plane view, have two straight sides opposed in parallel and two arc sides each of which connects ends of the straight sides.

* * * * *